United States Patent [19]
Clark

[11] 4,106,812
[45] Aug. 15, 1978

[54] SIDE DUMPING VEHICLE

[76] Inventor: Lee M. Clark, 4400 Philadelphia #61, Chino, Calif. 91710

[21] Appl. No.: 794,799

[22] Filed: May 9, 1977

[51] Int. Cl.² ............................................. B60P 1/34
[52] U.S. Cl. .................................... 298/1 B; 105/246; 105/260; 214/82
[58] Field of Search ................... 214/82, 514; 298/1 B, 298/18, 22 R, 26; 105/246, 260; 294/69 R

[56] References Cited

U.S. PATENT DOCUMENTS

| 540,484 | 6/1895 | Cropp | 105/260 X |
| 589,313 | 8/1897 | Smith | 105/246 X |
| 1,067,074 | 7/1913 | Strellner et al. | 105/260 |
| 1,096,352 | 5/1914 | Burnett | 105/256 |
| 1,188,787 | 6/1916 | Hunt | 105/260 |
| 1,293,954 | 2/1919 | Skidmore | 105/255 |
| 3,450,284 | 6/1969 | Diem | 214/82 X |
| 3,759,561 | 9/1973 | Barnes | 294/69 R |

FOREIGN PATENT DOCUMENTS

| 531,425 | 9/1931 | Fed. Rep. of Germany. |
| 564,509 | 11/1932 | Fed. Rep. of Germany. |
| 34,667 | 4/1911 | Sweden. |

Primary Examiner—Robert G. Sheridan
Attorney, Agent, or Firm—Harris, Kern, Wallen & Tinsley

[57] ABSTRACT

A side dumping vehicle having pivotally interconnected bottom walls and side walls which may be displaced between a trough shaped configuration in cross section and an inverted "V" configuration in cross section. In changing the configuration from that of a trough to that of an inverted "V", a load carried by the vehicle is dumped on both sides thereof.

5 Claims, 7 Drawing Figures

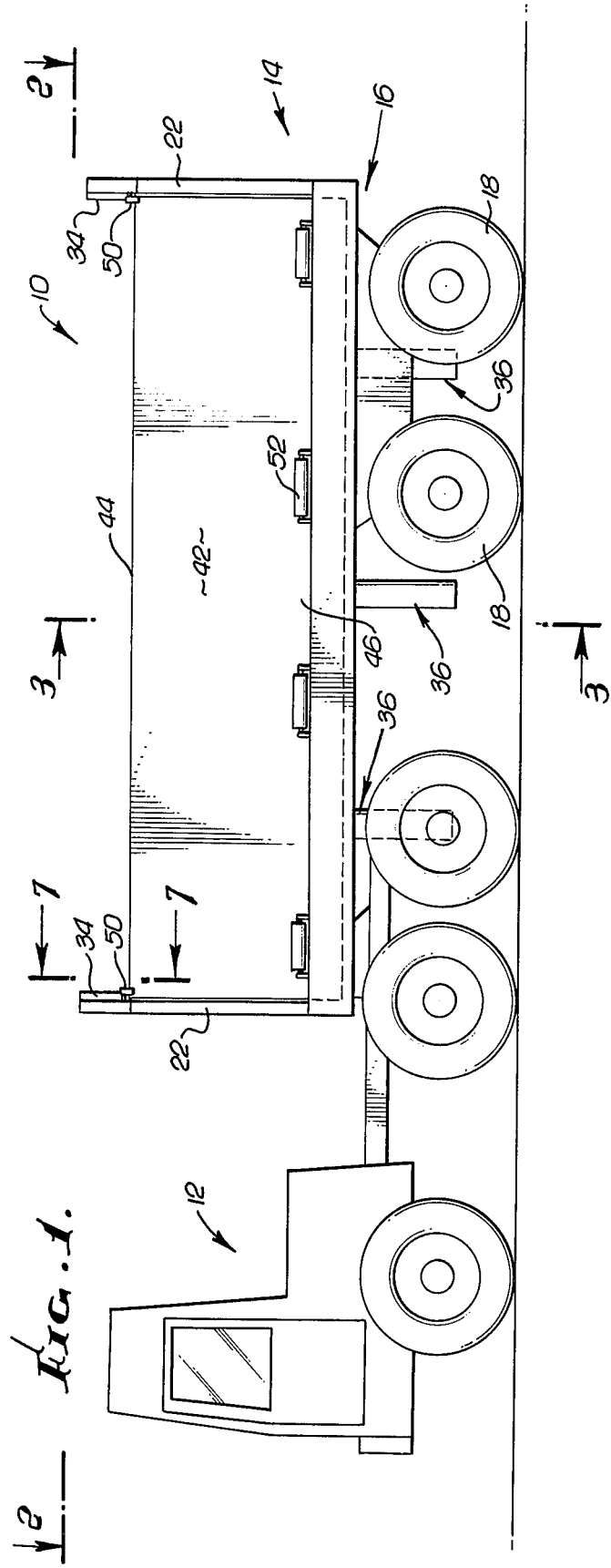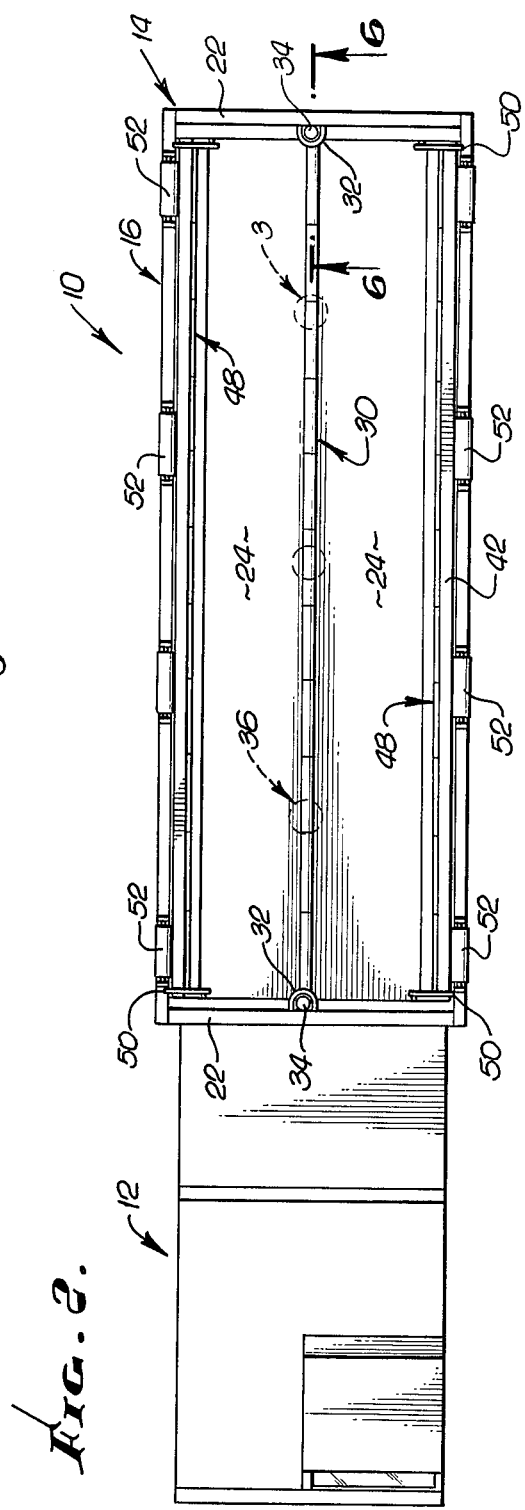

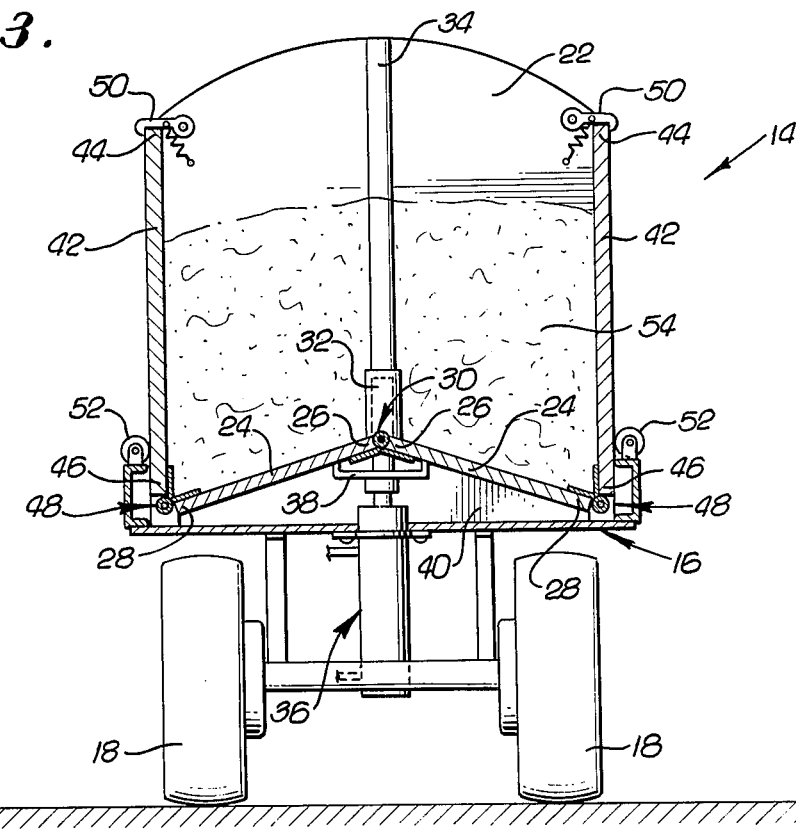
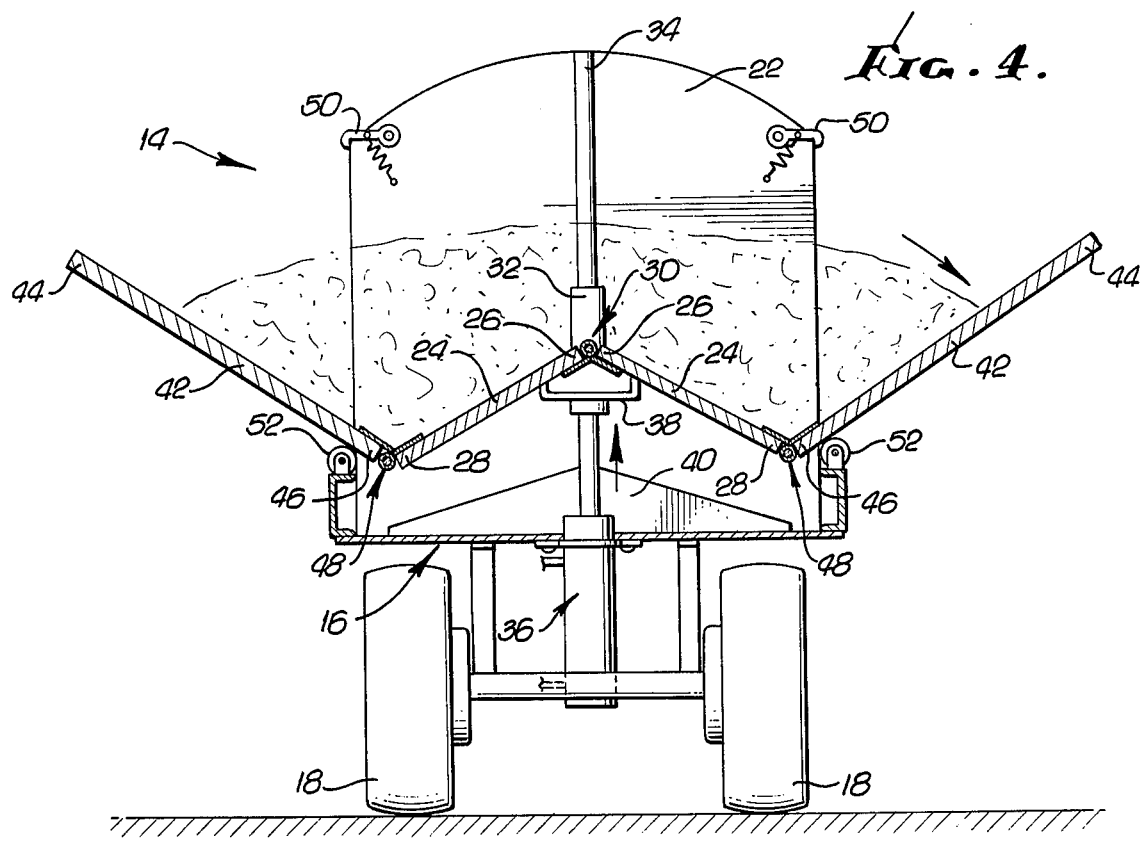

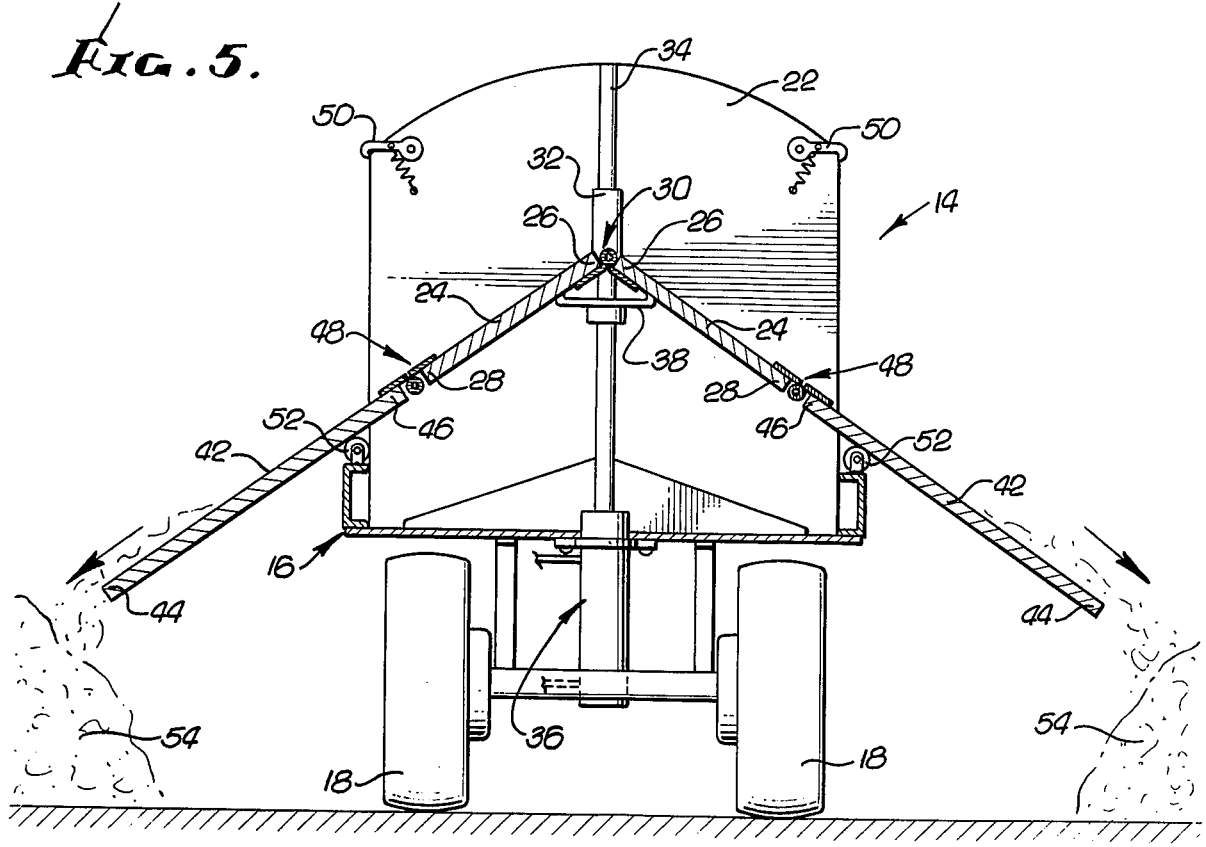
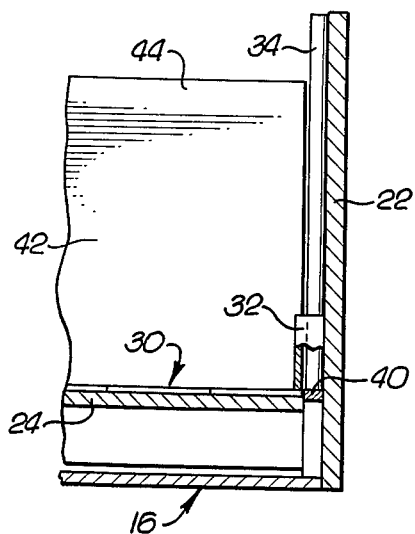
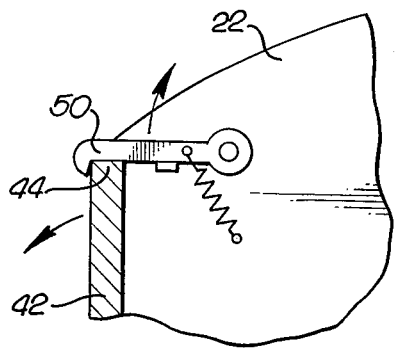

SIDE DUMPING VEHICLE

BACKGROUND OF INVENTION

The present invention relates in general to vehicles which are unloaded by dumping and, more particularly, to a vehicle which is unloaded by dumping to both sides.

SUMMARY AND OBJECTS OF INVENTION

The invention may be summarized as including, and a primary object of the invention is to provide a side dumping vehicle which includes, two pivotally interconnected bottom walls and two side walls respectively pivotally connected to the bottom walls, and means for displacing the bottom and side walls between a trough shaped configuration in cross section and an inverted "V" configuration in cross section. When the bottom and side walls are arranged in a trough shaped configuration in cross section, the vehicle is in its load carrying condition. When the bottom and side walls are arranged in an inverted "V" configuration in cross section, the vehicle dumps to both sides.

The invention may be further summarized as including, and another important object is to provide a side dumping vehicle which includes:

a chassis having longitudinally spaced end walls;

two bottom walls extending longitudinally between the end walls and having inner and outer longitudinal edges;

first hinge means pivotally interconnecting the inner edges of the bottom walls;

two side walls extending longitudinally between the end walls and having upper and lower longitudinal edges;

two second hinge means respectively pivotally interconnecting the lower edges of the side walls and the outer edges of the bottom walls;

two securing means for respectively releasably securing the side walls in upright positions;

two supporting means for respectively movably supporting the side walls for movement between upright, load carrying positions and laterally outwardly and downwardly sloping, side dumping positions;

means for guiding the first hinge means along an upright path;

actuating means for moving the first hinge means upwardly and downwardly along the upright path; and whereby the bottom walls and the side walls may be displaced between a trough shaped, load carrying configuration in cross section, and an inverted "V", side dumping configuration in cross section.

Another object is to provide a side dumping vehicle wherein the supporting means for the side walls comprise rollers which are carried by the chassis and on which the side walls rest in moving between their upright positions and their laterally outwardly and downwardly sloping positions.

Yet another object is to provide a construction wherein the chassis carries supports for the bottom walls which maintain the bottom walls in the cross-section configuration of an inverted "V" when in their lowermost positions.

An additional object is to provide a side dumping vehicle wherein the actuating means includes upright fluid operated motors of the reciprocating type preferably double acting telescopic hydraulic rams, longitudinally spaced apart along the first hinge means.

The foregoing objects, advantages, features and results of the present invention, together with various other objects, advantages, features and results thereof which will be evident to those skilled in the art of side dumping vehicles in the light of this disclosure, may be achieved with the exemplary embodiment illustrated in the accompanying drawings and described in detail hereinafter.

DESCRIPTION OF DRAWINGS

FIG. 1 is a side elevational view of a side dumping vehicle which embodies the invention;

FIG. 2 is a plan view of the vehicle taken as indicated by the arrowed line 2—2 of FIG. 1;

FIG. 3 is a transverse sectional view taken as indicated by the arrowed line 3—3 of FIG. 1 and showing bottom and side walls of the vehicle in load carrying positions;

FIG. 4 is a view similar to FIG. 3, but showing bottom and side walls of the vehicle displaced part way toward dumping positions;

FIG. 5 is a view similar to FIGS. 3 and 4, but showing the bottom and side walls displaced all of the way to side dumping positions;

FIG. 6 is a fragmentary sectional view taken as indicated by the arrowed line 6—6 of FIG. 2; and FIG. 7 is a fragmentary sectional view taken as indicated by the arrowed line 7—7 of FIG. 1 of the drawings.

DETAILED DESCRIPTION OF EXEMPLARY EMBODIMENT

As best shown in FIG. 1 of the drawings, the side dumping vehicle of the invention is designated generally by the numeral 10 and is illustrated, for convenience, as comprising a tractor 12 and a semitrailer 14. The latter includes a chassis 16 the front end of which is pivotally supported by the tractor 12 in the usual manner and the rear end of which is provided with wheels 18, as is conventional.

The chassis 16 is provided at its front and rear ends with longitudinally spaced, upright, front and rear end walls 22. Two bottom walls 24 extend longitudinally between the end walls 22 and are provided with inner and outer longitudinal edges 26 and 28. The inner edges 26 are pivotally interconnected by a first hinge means 30.

The hinge means 30 is provided at its front and rear ends with guide followers 32 which are movable upwardly and downwardly along upright guides 34 carried by the front and rear end walls 22, as will be clear from FIGS. 3, 4 and 5 of the drawings. The hinge means 30 is moved upwardly and downwardly along the upright path provided by the guides 34 by longitudinally spaced, upright, fluid operated rams 36, which may be hydraulic. The cylinders of the rams 36 are shown as anchored to the chassis 16, while the piston rods thereof terminate in elements 38 which support the inner edges 26 of the bottom walls 24.

When the bottom walls 24 and in their lowermost positions, as shown in FIG. 3, they rest on supports 40 on the chassis 16 which maintain the bottom walls in the configuration of an inverted "V", the supports 40 having a complementary configuration.

Two side walls 42 also extend longitudinally between the end walls 22 and, considering the positions shown in FIG. 3, have edges 44 and 46 which are referred to as upper and lower for convenience. Two second hinge means 48 respectively pivotally connect the edges 46 of the side walls 42 to the edges 28 of the bottom walls 24. Latches 50 on the end walls 22 are engagable with the upper edges 44 of the side walls 42 support the side walls in their upright positions, as shown in FIG. 3 of the drawings. When the side walls 42 are in their upright positions, the weights thereof are carried by the bottom walls 24 through the hinge means 48.

When the latches 50 are released so that the side walls 42 pivot outwardly toward the positions shown in FIGS. 4 and 5, the side walls 42 are movably supported by supporting means comprising rollers 52 carried by the chassis 16. As will be clear from FIGS. 3, 4 and 5, the rollers 52 permit the side walls 42 to move outwardly and downwardly between their upright positions, FIG. 3, and laterally outwardly and downwardly sloping positions, FIG. 5, wherein the bottom walls 24 and the side walls 42 have an inverted "V" configuration in cross section. When the bottom walls 24 and the side walls 42 are in the position of FIG. 3, they have a trough shaped configuration in cross section to carry a load 54.

Considering the operation of the side dumping vehicle 10 of the invention, the bottom and side walls 24 and 42 are in the positions shown in FIG. 3, with the side walls 42 latched by the latches 50, when it is desired to transport the load 54.

To dump the load 54, the latches 50 are first released, which permits the side walls 42 to pivot outwardly sufficiently to bear against the rollers 52. Then, the motors 36 are actuated to elevate the first hinge means 30, whereupon the bottom walls 24 and the side walls 42 move through the positions shown in FIG. 4 to the positions shown in FIG. 5, wherein the inverted "V" cnnfiguration results in side dumping of the load 54 off the longitudinal edges 44 of the side walls 42.

An important feature of the invention is that the bottom walls 24 and the side walls 42 are subjected to accurately controlled motions in being displaced between the positions shown in FIGS. 3 and 5 of the drawings, this being the result of the pivotal interconnections provided by the hinge means 30 and 48, the guided motion of the hinge means 30 provided by the guides 34, and the guided motion of the side walls 42 provided by the rollers 52 and the hinge means 30 and 48.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. In a side dumping vehicle, the combination of:
   (a) a chassis having longitudinally spaced end walls;
   (b) two bottom walls extending longitudinally between said end walls and having inner and outer longitudinal edges;
   (c) first hinge means pivotally interconnecting said inner edges of said bottom walls;
   (d) two side walls extending longitudinally between said end walls and having upper and lower longitudinal edges;
   (e) two second hinge means respectively pivotally interconnecting said lower edges of said side walls and said outer edges of said bottom walls;
   (f) two securing means for respectively releasably securing said side walls in upright positions;
   (g) two supporting means for respectively movably supporting said side walls for movement between upright positions and laterally outwardly and downwardly sloping positions;
   (h) means for guiding said first hinge means along an upright path;
   (i) actuating means for moving said first hinge means upwardly and downwardly along said upright path; and
   (j) whereby said bottom walls and said side walls may be displaced between a trough shaped configuration in cross section and an inverted "V" configuration in cross section.

2. A side dumping vehicle as defined in claim 1 wherein said supporting means comprise rollers which are carried by said chassis and on which said side walls rest in moving between their upright positions and their laterally outwardly and downwardly sloping positions.

3. A side dumping vehicle according to claim 1 wherein said chassis carries supports for said bottom walls which maintain said bottom walls in the cross-sectional configuration of an inverted "V" when in their lowermost positions.

4. A side dumping vehicle as set forth in claim 1 wherein said actuating means includes upright fluid operated motors of the reciprocating type longitudinally spaced apart along said first hinge means.

5. A side dumping vehicle comprising two bottom walls respectively having inner and outer edges and two side walls respectively having upper and lower edges, first hinge means pivotally interconnecting said inner edges of said bottom walls, two second hinge means respectively pivotally interconnecting said lower edges of said side walls and said outer edges of said bottom walls, two supporting means for respectively moveably supporting said side walls for movement between upright positions and laterally outwardly and downwardly sloping positions, and means for displacing said bottom and side walls between a trough shaped configuration in cross section and an inverted "V" configuration in cross section.

* * * * *